(12) United States Patent
Tucker

(10) Patent No.: US 7,140,813 B2
(45) Date of Patent: Nov. 28, 2006

(54) LINE BORING MACHINE

(76) Inventor: Bradley J. Tucker, 1 LaCosta Ct., Laguna Beach, CA (US) 92651

( * ) Notice: Subject to any disclaimer, the term of this patent is extended or adjusted under 35 U.S.C. 154(b) by 336 days.

(21) Appl. No.: 10/619,782

(22) Filed: Jul. 15, 2003

(65) Prior Publication Data

US 2005/0013673 A1 Jan. 20, 2005

(51) Int. Cl.
*B23B 47/18* (2006.01)
(52) U.S. Cl. .................... 408/43; 408/51; 408/53; 408/103; 408/129; 408/130; 408/136
(58) Field of Classification Search ............. 408/42, 408/43, 51, 52, 53, 103, 129, 130, 136, 236, 408/95, 1 R
See application file for complete search history.

(56) References Cited

U.S. PATENT DOCUMENTS

| | | | | |
|---|---|---|---|---|
| 243,544 A * | 6/1881 | Gassett et al. | ............... | 408/95 |
| 673,737 A * | 5/1901 | Smith | ........................ | 408/30 |
| 842,544 A * | 1/1907 | Handlan, Jr. | ................ | 408/43 |
| 1,148,640 A | 8/1915 | Wehner | | |
| 1,272,108 A * | 7/1918 | Robb et al. | ................. | 408/136 |
| 1,954,920 A * | 4/1934 | Damerell | .................... | 269/107 |
| 2,420,759 A * | 5/1947 | Stelz | ........................... | 408/89 |
| 2,466,965 A * | 4/1949 | Pitts | ........................... | 408/99 |
| 2,512,753 A * | 6/1950 | Topham | ...................... | 408/98 |
| 2,625,063 A * | 1/1953 | Hanson | ...................... | 408/95 |
| 2,629,411 A * | 2/1953 | Jones | ........................ | 144/84 |
| 2,703,994 A * | 3/1955 | Mezey | ....................... | 408/40 |
| 2,821,872 A * | 2/1958 | Salfer | ........................ | 408/92 |
| 2,824,470 A * | 2/1958 | Monroe | ...................... | 408/103 |
| 3,041,896 A * | 7/1962 | May | ........................... | 408/11 |
| 3,060,769 A * | 10/1962 | Heider | ....................... | 408/95 |
| 3,183,743 A * | 5/1965 | O'Donnell et al. | .......... | 408/30 |
| 3,447,454 A * | 6/1969 | Ratz | .......................... | 100/266 |
| 3,452,792 A | 7/1969 | Foreman | | |
| 3,698,827 A * | 10/1972 | Salfer | ........................ | 408/92 |
| 3,954,347 A * | 5/1976 | Mechalas | .................... | 408/31 |
| 4,061,435 A | 12/1977 | Schmanski et al. | | |
| 4,280,775 A * | 7/1981 | Wood | .......................... | 408/3 |
| 4,537,234 A * | 8/1985 | Onsrud | .................... | 144/135.2 |
| 4,573,835 A * | 3/1986 | Eckardt et al. | .............. | 408/37 |
| 4,664,566 A * | 5/1987 | Peddinghaus | ............... | 408/13 |
| 4,830,554 A | 5/1989 | Lopez | | |
| 5,036,574 A * | 8/1991 | Kakimoto | ................... | 29/33 S |
| 5,197,527 A | 3/1993 | Namba et al. | | |

(Continued)

FOREIGN PATENT DOCUMENTS

DE 3120331 A 12/1982

(Continued)

*Primary Examiner*—Monica Carter
*Assistant Examiner*—Michael W. Talbot
(74) *Attorney, Agent, or Firm*—Stetina Brunda Garred & Brucker

(57) ABSTRACT

An up modifier is provided which includes a bed, a modifier, a clamp, a modifier linkage system, a clamp linkage system, and a lever. The modifier is disposed below the bed and is vertically traversable thereunder. The clamp is disposed above the bed and is vertically traversable thereabove. The lever defines a modifier pivot, clamp pivot and a pedal portion. The clamp pivot is interposed between the modifier pivot and the pedal portion. The clamp pivot is vertically traversable, and the modifier pivot and the pedal portion are pivotable about the clamp pivot. The modifier linkage system is attached to the modifier and the lever at the modifier pivot, and the clamp linkage system is attached to the clamp and the lever at the clamp pivot.

22 Claims, 4 Drawing Sheets

U.S. PATENT DOCUMENTS

| | | | |
|---|---|---|---|
| 5,404,641 A * | 4/1995 | Bratten et al. | 29/897.2 |
| 5,429,896 A | 7/1995 | Hasegawa et al. | |
| 5,785,467 A * | 7/1998 | Gardner | 408/87 |
| 5,785,469 A | 7/1998 | Kamada et al. | |
| 5,863,158 A * | 1/1999 | Foshee et al. | 408/92 |
| 5,863,160 A * | 1/1999 | Havener | 408/136 |
| 5,888,032 A * | 3/1999 | Jensen | 408/1 R |
| 5,961,258 A * | 10/1999 | Ende et al. | 408/103 |
| 6,595,728 B1 * | 7/2003 | Miao | 408/41 |

FOREIGN PATENT DOCUMENTS

| | | | |
|---|---|---|---|
| DE | 3531988 A1 | * | 3/1987 |
| EP | 292712 A2 | * | 11/1988 |
| GB | 307668 | | 3/1929 |
| GB | 2102313 A | * | 2/1983 |
| GB | 2243568 A | * | 11/1991 |
| JP | 55120910 A | * | 9/1980 |
| WO | WO 92/12816 | | 8/1992 |

* cited by examiner

LINE BORING MACHINE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

This invention relates generally to line boring machines which bore holes in a work piece from a side of the work piece resting on a bed, and more particularly, to machines which have a lever mechanically attached to both a clamp and a drill so as to advantageously produce a self-adjusting downward clamp force on the work piece which is always greater than an upward drill force.

In manufacturing, a block of metal or a piece of wood is formed into a useful shape. For example, in a wood cabinet with adjustable shelves, the same may have side panels with a series of bored holes. The holes are used to insert pins such that the shelf may rest thereon to make a shelf height adjustable. To this end, the bored holes are commonly drilled out. When the holes are drilled from above, wood chips tends to clog up the holes. Typically, a drill bit has flutes to allow the chips to exit the holes. Nonetheless, the chips rest on a top surface of the side panels. In this regard, the chips may re-enter the hole and/or may visually block the hole from an operator of the drill. As such, the operator must frequently clear off the chips from the side panels prior to continuing the process of drilling. To alleviate the problem of continually clearing out the holes, the holes would be automatically cleared out if the holes were drilled from a bottom side of the side panel because gravity would clear the holes through gravitational forces.

Currently, machines exist where the work piece rests on a bed, and drills are located below the work piece and bed and traverse upwardly to make holes in the side panels. In this regard, the wood chips are cleared from the holes through gravitational forces. These machines typically have a push down clamp which applies a downward clamp force to the work piece such that the work piece does not lose stability in relation to a bed when the work piece is being drilled from its underside. In these machines, the power which traverses the drill between an up position and a down position is independent from the power which provides the downward clamp force exerted by the clamp.

This dual system of power transmission is inefficient because it requires constant adjustment and more parts. In particular, an upward drill force is exerted on the work piece by the drills and is a function of the number of drills. If a plurality of drills were to simultaneously drill holes from the underside of the side panel then the drill upward force may be greater than the downward clamp force because of the dual system. This situation would cause the work piece to lift off the bed and become unstable thereby the holes may not be properly positioned. In response, the operator must continually adjust (i.e., increase or decrease) the downward clamp force when the number of drills are changed or when the upward drill force changes.

Accordingly, there is a need in the art for an improved apparatus to alleviate the problems of the prior art such as the need to constantly adjust the downward clamp to be greater than a upward drill force and the additional parts to support the dual system.

BRIEF SUMMARY OF THE INVENTION

In an embodiment of the present invention, a line boring machine is provided for the purpose of boring holes in a bottom surface of a work piece. The line boring machine may comprise a bed, drill, clamp, drill linkage system, clamp linkage system and a lever. The mechanical relationship between the lever, drill linkage system and clamp linkage system enables the clamp linkage system to advantageously produce a self-adjusting downward clamp force onto the work piece which is always greater than an upward drill force exerted by the drill through the drill linkage system.

The bed may receive the work piece. In this regard, the bottom surface of the work piece may rest on a top surface of the bed. The drill may be disposed below the bed, and be vertically traverseable thereunder. The drill may have a drill bit which rotates about its longitudinal axis. The longitudinal axis of the drill bit may be aligned vertically. The drill may have an up position and a down position. When the drill is in the up position, the drill may bore holes in the bottom surface of work piece. The clamp may be disposed above the bed and be vertically traversable thereabove. The clamp fixes the spatial relationship between the work piece and the bed after the bed receives the work piece. The clamp may have an up position and a down position. When the clamp is in the down position, the work piece may not be moved with respect to the bed. The lever may define a drill pivot, clamp pivot and pedal portion. The lever may be rotatable about the clamp pivot. The clamp pivot may be vertically traversable and is interposed between the drill pivot and the pedal portion. The drill linkage system may be attached to the drill, and the clamp linkage system may be attached to the clamp. In particular, the lever at the drill pivot may be attached to the drill linkage system, and the lever at the clamp pivot may be attached to the clamp linkage system.

The bed may define a work pattern. The work pattern may be at least one through-hole. In this regard, the drill may pass through the work pattern such that the holes may be bored/drilled in the work piece.

The drill pivot defines an up position and a down position. The drill pivot may be biased to the down position such as through a weight of the drill and/or a spring. The clamp pivot defines an up position and a down position. The clamp pivot may be biased to the up position such as through a spring. The drill pivot may be downwardly biased to a greater extent than the amount the clamp pivot is upwardly biased.

In an aspect of the present invention, the clamp linkage system may be at least one pull cable attached to the clamp and the lever.

In another aspect of the present invention, the clamp linkage system may comprise at least one minor L-link attached to the clamp, and at least one major L-link attached to the minor L-link and lever. The minor L-link(s) defines a fixed pivot, first leg and second leg. The first leg(s) of the minor L-link may be attached to the clamp. The first and second legs may be pivotable about the fixed pivot of the minor L-link. At least one first elongate bar may be rotatably attached to the minor L-link(s) second leg(s). The major L-link(s) defines a fixed pivot, first leg and second leg. The second leg(s) of the major L-links may be rotatably attached to the first elongate bar. The first and second legs of the major L-link may be pivotable about the fixed pivot of the major L-link. At least one second elongate bar may be rotatably attached to the major L-link first leg(s) and the lever at the clamp pivot.

In another aspect of the present invention, the clamp linkage system may comprise at least one C-link attached to the clamp and the lever. The C-link may define a base, first leg and second leg. The base may define a fixed pivot. The base, first leg and second leg may be pivotable about the fixed pivot. The second leg may be attached to the clamp. An elongate bar may be rotatably attached to the first leg of the C-link and the lever.

In another aspect of the present invention, the line boring machine may further comprise a pressure applicator contactable to the pedal portion. The pedal portion defines an up position and a down position. The pressure applicator may be operative to traverse the pedal portion between the up and down position. The pressure applicator may be selected from the group consisting of solenoid, pneumatic cylinder, and hydraulic cylinder.

BRIEF DESCRIPTION OF THE DRAWINGS

An illustrative and presently preferred embodiment of the invention as shown in the accompanying drawings and which.

DETAILED DESCRIPTION OF THE INVENTION

Figure 1:
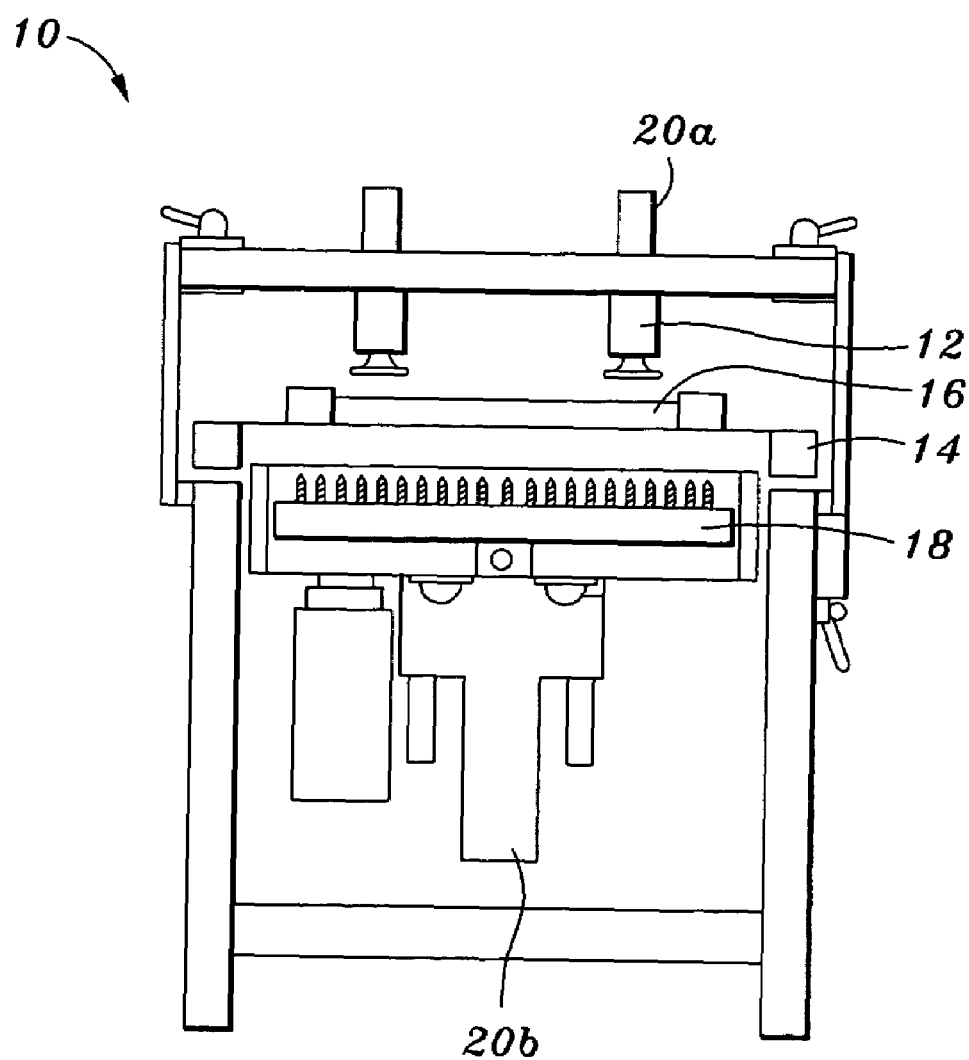
FIG. 1 is a front view of a prior art line boring machine having a first system for applying a downward clamp force to stabilize a work piece and a separate second system for vertically traversing the drill.

FIGS. 1–4 are for the purposes of illustrating the preferred embodiments of the present invention and not for the purposes of limiting the same. FIG. 1 illustrates a prior art line boring machine 10. In particular, the prior art line boring machine 10 comprises a push down clamp 12, bed 14, work piece 16 and drill 18. The push down clamp 12 is powered through a motor 20a located above the bed 14. The drills 18 located below the bed 14 of the up-drill 10 are vertically traversed through a motor 20b located below the bed 14. In this regard, the pressure applied to the work piece 16 by the push down clamp 12 is independent of the force applied to the work piece 16 by the drills 18 from below the bed 14. As such, the downward clamp force exerted on the work piece 16 by the clamp 12 must be manually adjusted as a function of the work to be done on the work piece 16 from the underside of the work piece 16. For example, the upward drill force exerted on the work piece 16 from the drills 18 is a function of the number of drills 18. As such, if the number of drills 18 are increased then the downward clamp force must accordingly be increased. To achieve a downward clamp force exerted by the clamp greater than an upward drill force exerted by the drills 18, an operator must set the machine up by trial and error for such a condition which is time consuming.

Figure 2:
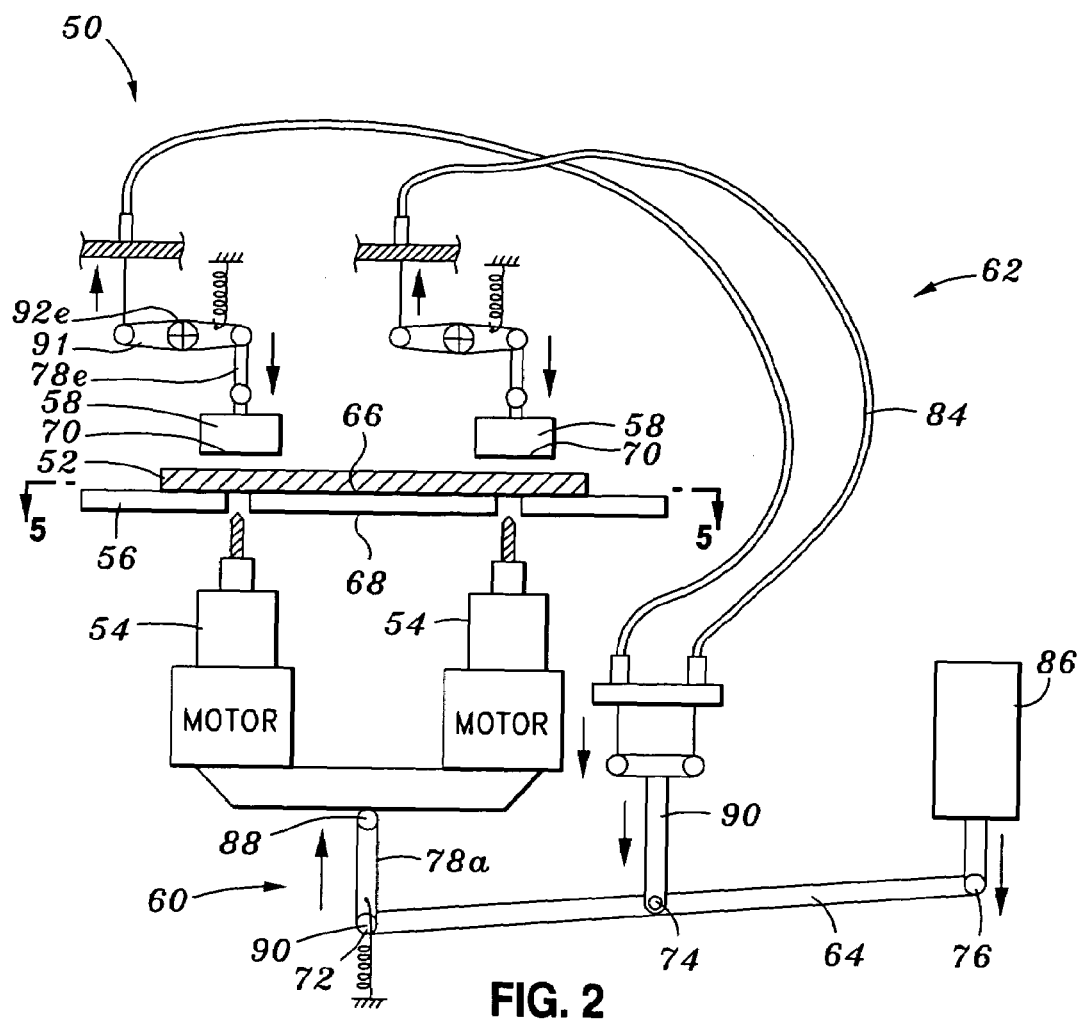
FIG. 2 illustrates a line boring machine having a single lever for applying a clamp downward force to a work piece and vertically traversing a drill, and a drill linkage system having at least one pull cable.

An embodiment of the present invention which alleviates the problems associated with the prior art line boring machine 10 is shown in FIG. 2. FIG. 2 illustrates a line boring machine 50 having a single lever for applying a downward clamp force on a work piece 52 and traversing a drill 54 in a vertical direction. In particular, the line boring machine 50 may comprise a bed 56, the drill 54, a clamp 58, a drill linkage system 60, a clamp linkage system 62 and a lever 64. The mechanical relationship between the lever 64, drill linkage system 60 and clamp linkage system 62 enables the clamp linkage system 62 to advantageously produce a self-adjusting downward clamp force onto the work piece 52 which is always greater than an upward drill force exerted by the drill 54 through the drill linkage system 60. In other words, the downward clamp force increases proportionally compared to the upward drill force. Additionally, the downward clamp force is self adjusting in relation to the upward drill force in that the user does not need to mechanically adjust the line boring machine to increase the downward clamp force when the upward drill force is increased.

The lever being attached to the clamp linkage system and the drill linkage system as described in this specification has at least three distinct advantages. First, the downward clamp force is always greater compared to the upward drill force. Second, the downward clamp force is self adjusting in relation to the upward drill force. In particular, the user does not need to adjust the mechanical parts of the line boring machine such that the downward clamp force is greater than the upward drill force. Third, the downward clamp force may be adjusted to be a certain degree or amount of force greater than the upward drill force by changing a ratio of the distance between (1) a drill pivot to a clamp pivot and (2) a clamp pivot to a pedal portion. The force relationship between the downward clamp force and the upward drill force will be discussed in relation to preferred embodiments of the line boring machine.

The bed 56 defines opposed top and bottom surfaces 66, 68. The top surface 66 may be substantially flat to receive the work piece 52 such that the work piece 52 does not wobble when (1) the work piece 52 is secured to the bed 56 by the clamp 58 and (2) worked on by the drill 54. The bed 56 may be sufficiently rigid such that the drill 54 may accurately work the work piece 52. In other words, the forces acting on the work piece 52 from the components of the line boring machine 50 such as the drill 54 and the clamp 58 does not bend and twist or otherwise deform the bed 56 when the work piece 52 is secured to the bed 56 by the clamp 58 and worked on by the drill 54. By way of example and not limitation, the bed 56 may be manufactured from materials such as steel, wood and plastic.

Figure 5:
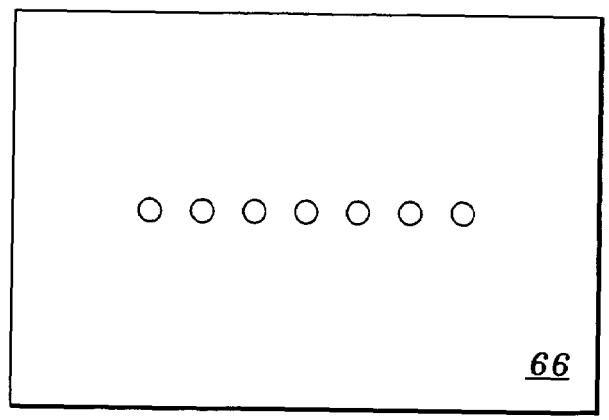
FIG. 5 illustrates a top view of bed having a series of holes.

The bed 56 may have a work pattern. The work pattern may be at least one through hole wherein the through hole extends from the top surface 66 of the bed 56 to the opposed bottom surface 68 of the bed 56. By way of example and not limitation, the through holes may have shapes such as circular holes, oval holes, curved slots and straight slots. The work pattern may be determined by the type of work to be done on the work piece. For example, the work piece 52 may be a sheet of particle board used in an adjustable shelf cabinet. In this regard, the particle board may have a series of bored holes such that a cabinet owner may place pins in respective holes to locate the various shelves in the adjustable shelf cabinet. As such, the work pattern of the bed 56 may be configured as a series of holes to allow the drill(s) 54 to have its drill bit(s) proceed through the series of holes and form the series of bored holes in the particle board (see FIG. 5). The work pattern (e.g., through holes) of the bed 56 may provide access to the areas of the particle board which require the bored holes.

The bed 56 may be removably attachable to the line boring machine 50. In this regard, the bed 56 having a particular work pattern may be switched out with a different bed 56 having a different work pattern.

The drill 54 may be disposed below the bed 56. The drill 54 may be vertically traversable between a down position and an up position. In the down position, the drill 54 may not protrude through the top surface 66 of the bed 56, and in the up position, the drill 54 may protrude through the top surface 66 of the bed 56. The amount of protrusion may be adjustable. As the drill 54 moves from the down position to the up position so as to bore holes in the work piece 52, the drill 54 exerts an upward drill force on the work piece 52, and the work piece 52 exerts an equivalent reactionary downward force on the drill 54.

Generally, the drill 54 may be replaced with any type of device which may work the work piece 52. By way of example and not limitation, the drill 54 may be replaced with a router, etcher, or pin. There may be a plurality of drills 54 or in the alternative, a plurality of routers, etchers, or pins. For example, as shown in FIG. 2, two drills are shown. The plurality of routers, etchers or drills may be selectively configured below the bed 56 to match a selective work pattern of the bed 56. The selective configuration of the drills 54 may be in static relationship with respect to the other drills 54 or in dynamic relationship such as through a mechanically or computer controlled set of drills 54. Additionally, as stated above, the drill 54 exerts an upward force on the work piece 52. This upward force will be referred to as the drill upward force. As stated above, there may be a plurality of drills 54. As such, the aggregate drill upward force is proportional to the number of drills 54.

The clamp 58 is disposed above the bed 56. The clamp 58 may be vertically traversable between a down position and an up position. The clamp 58 may be biased to the up position. When the clamp 58 is in the down position, the clamp 58 may secure the work piece 52 to the bed 56. The force of the clamp 58 which secures the work piece 52 to the bed 56 will be referred to as the clamp downward force. The clamp 58 is operative to always apply a greater aggregate clamp downward force on the work piece 52 compared to the aggregate drill upward force because of the mechanical relationship between the clamp linkage system, drill linkage system and lever.

The clamp 58 may have a bottom surface 70 which applies the clamp downward force onto the work piece 52. There may be a plurality of clamps 58. The bottom surface 70 of the clamp 58 may be flat or have ridges to provide horizontal friction to the work piece 52 so as to stabilize the work piece 52 to the bed 56 in the horizontal plane.

The lever 64 may be an elongate bar. The elongate bar may define a drill pivot 72, a clamp pivot 74 and a pedal portion 76. The clamp pivot 74 may be vertically traversable and define up and down positions, and may be biased to be in the up position. Additionally, the clamp pivot 74 may be interposed between the drill pivot 72 and the pedal portion 76. In this regard, when the pedal portion 76 is pushed to a down position, then the drill pivot 72 is traversed to an up position. The drill pivot 72 defines up and down positions, and may be biased to be in the down position. Preferably, the distances from the (1) drill pivot 72 to the clamp pivot 74 and (2) the pedal portion 76 to the clamp pivot 74 are equal. These two distances may be altered such that the difference in downward clamp force and upward drill force may be increased or decreased. For example, the difference is decreased as the distance between the clamp pivot and pedal portion is increased.

The clamp linkage system 62 may be attached to the clamp 58 and the lever 64 at a clamp pivot 74, and the drill linkage system 60 may be attached to the drill 54 and the lever 64 at the drill pivot 72. The linkage systems may be operative to transmit forces between the lever 64 and respective clamp 58 and drill 54. The force transmission ratio may be one or more with respect to the force originating from the lever 64 to the force transmitted to respective clamp 58 and drill 54. For an example of a one to one force transmission ratio, the lever 64 may exert two pounds of force through the clamp linkage system 62 and the clamp 58 may exert two pounds of clamp downward force in the aggregate onto the work piece 52. For an example of a one to two force transmission ratio, the lever 64 may exert one pound of force through the clamp linkage system 62 and the clamp 58 may exert two pounds of clamp downward force in the aggregate onto the work piece 52. By way of example and not limitation, the clamp and drill linkage systems 60, 62 may be a combination of at least one elongate bar 78 (see FIGS. 2–4), L-link 80 (see FIG. 3), C-link 82 (see FIG. 4), pulleys (not shown) and/or pull cables 84 (see FIG. 2), as discussed further below.

Figure 3:
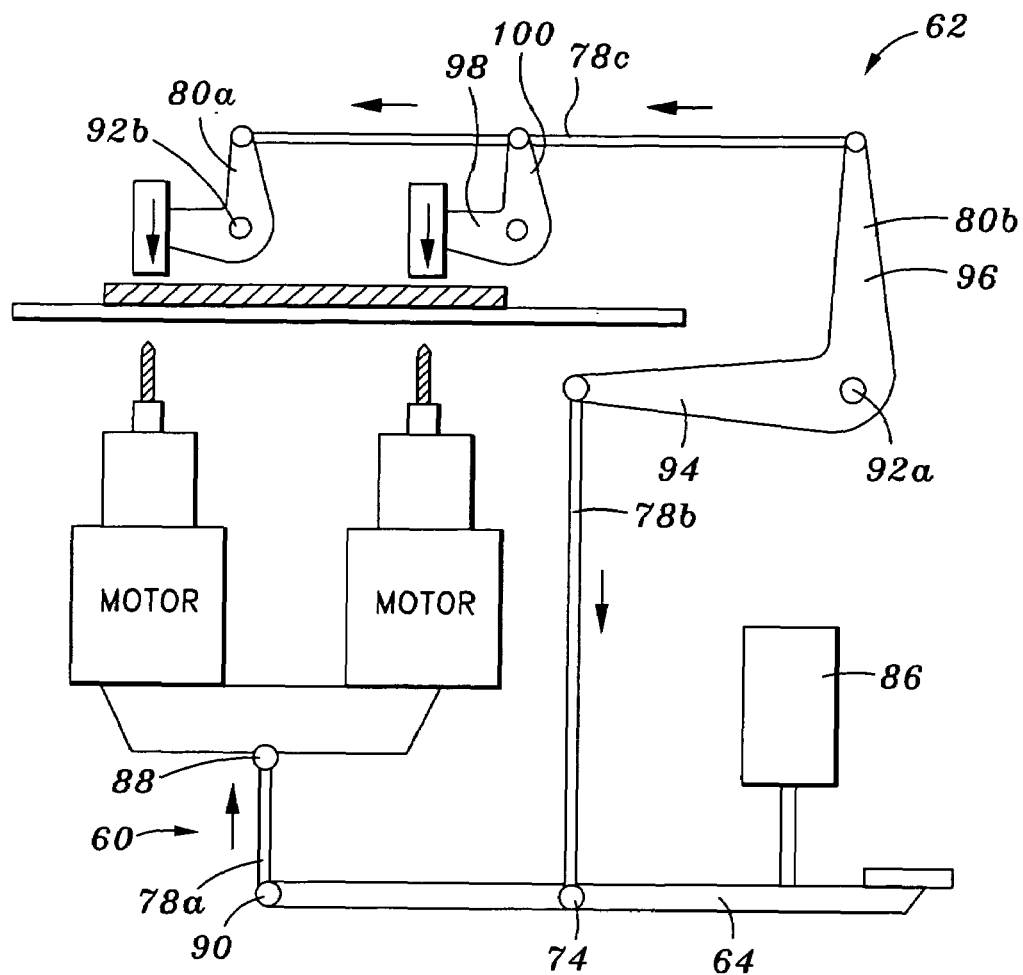
FIG. 3 illustrates the line boring machine having a single lever for applying the clamp downward force to the work piece and vertically traversing the drill, and the drill linkage system having a series of minor and major L-links.
Figure 4:
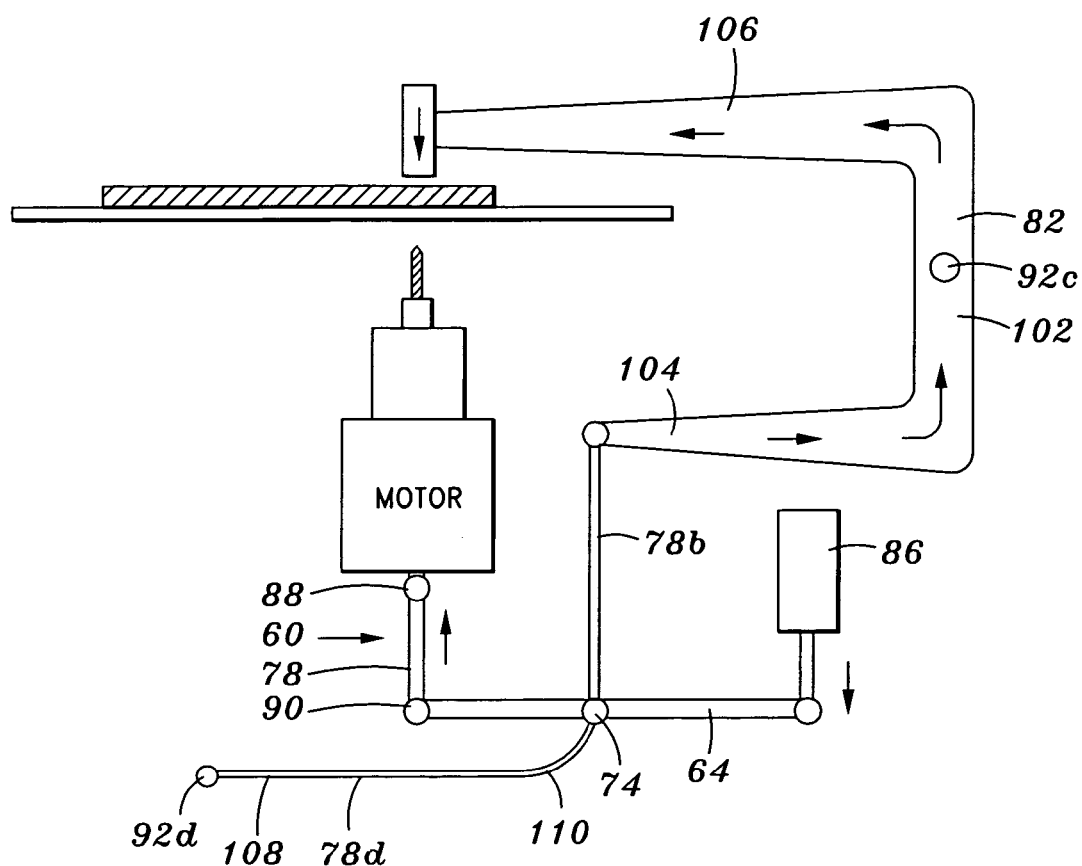
FIG. 4 illustrates the line boring machine having a single lever for applying the clamp downward force to the work piece and vertically traversing the drill, and the drill linkage system having a C-link.

Referring now to FIGS. 2–4, the drill linkage system 60 may be an elongate bar 78a which may rotatably attached to the drill 54 and to the lever 64. As stated above, the drill pivot 72 may be biased to be in the down position. In this regard, a weight of the drill 54 or a spring may be operative to bias the drill pivot 72 of the lever 64 to be in the down position. As stated above, the clamp pivot 74 may be biased to be in the up position. In this regard, a spring such as a torsion spring or compression spring placed within the clamp linkage system 62 or a compression spring placed underneath the lever 64 at the clamp pivot 74 may be operative to bias the clamp pivot 74 of the lever 64 to be in the up position.

The following is a discussion of the use of the line boring machine 50 and the forces generated by the lever 64 and transmitted to respective drill 54 and clamp 58. In use, pressure may be applied to the pedal portion 76 of the lever 64 with a pressure applicator 86. The pressure applicator may be a user, hydraulic cylinder, pneumatic cylinder, and/or solenoid. The pressure applicator 86 may be manually controlled by the user or automatically controlled by electronics. In response to the pressure applied to the pedal portion 76, the clamp pivot 74 would start to traverse in the down direction and overcome the up position bias of the clamp pivot 74. Additionally, there would be an upward force exerted onto the drill 54, but may be insufficient to traverse the drill 54 from the down position to the up position. The clamp pivot 74 would continue to transverse downward and transmit a force through the clamp linkage system 62 to the clamp 58. At the clamp 58, the same would traverse from the up position to the down position until the clamp 58 is in contact with the work piece 52. Increasing pressure would be applied to the pedal portion 76 of the lever 64 and in response the drill would traverse from the down position to the up position. At this point, the clamp downward force being exerted on the work piece 52 may be equal to the sum of the downward biasing force applied to the lever 64 at the drill pivot 72 and the downward force applied to the pedal portion 76 of the lever 64 less the upward biasing force of the clamp pivot 74.

As the pedal portion 76 continues to traverse to the down position, the drill 54 would continue to traverse to the up position. When the drill 54 contacts the work piece 52, the work piece 52 is subjected to a drill upward force. For example, a drill would require at least a minimum amount of force to allow the drill bit to penetrate the work piece 52. Additionally, the work piece 52 exerts a downward force on the drill 54 which is transmitted to the lever 64. In turn, the downward force applied by the lever 64 at the clamp pivot 74 increases thereby increasing the clamp downward force. Hence, the clamp downward force is always greater than the drill upward force. In other words, the drill upward force increases as the clamp downward force increases. For these reasons, the downward clamp force is always greater than the upward drill force because the upward drill force is added to the downward clamp force. As such, the work piece is stabilized to the minimum amount in relation to the number of drills.

The following is a discussion of various embodiments of the drill linkage system 60 and the clamp linkage system 62. Referring now to FIGS. 2–4, the drill linkage system 60 may be a single elongate bar 78a wherein a first distal end 88 is pivotable about the drill 54 and a second distal end 90 is pivotable about the lever 64 at the drill pivot 72. The elongate bar 78a may be disposed within a guide tube (not shown) such that the drill 54 may move in the vertical direction proportionally to the amount of movement in the lever 64 at the drill pivot 72.

Referring now to FIG. 2, the clamp linkage system 62 may comprise at least one clamp 58 and a pull cable 84 attached to the (1) clamp 58 and (2) lever 64 at the clamp pivot 74. The pull cable 84 is operative to transmit an equivalent aggregate clamp downward force on the work piece 52 compared to the downward force applied to the pull cable 84 by the lever 64 at the clamp pivot 74. For example, as shown in FIG. 2, if the pressure applicator 86 creates a downward force at the pedal portion 76 of the lever 64 so as to produce a ten pound downward force on a T-bar 90 attached to the pull cables 84, five pounds of force will be transmitted through each of the pull cables 84. Each pull cable 84 is attached to a crank 91 pivotable about a fixed pivot 92e and transmits the clamp downward force onto the work piece 52 through an elongate bar 78e and clamp 58. In FIG. 2, each clamp 58 will apply a five pound clamp downward force to the work piece 52. As such, the aggregate clamp downward force is equal to ten pounds.

Referring now to FIG. 3, the clamp linkage system 62 may be a series of L-links 80a, 80b and elongate bars 78b, 78c. In contrast to FIG. 2, the downward pressure applied to the pedal portion 76 of the lever 64 may be exerted by a pneumatic or hydraulic cylinder actuated by the user in conjunction with the user manually pushing the pedal portion 76 of the lever 64 to the down position such as with the user's hand or foot. Additionally, the clamp linkage system 62 transmits a force created at the clamp pivot 74 through an elongate bar 78b and subsequently transmits the force through a major L-link 80b. The major L-link 80b is mechanically connected to a series of minor L-links 80a. The major L-link 80b defines a first leg 94, a second leg 96 and fixed pivot 92a, and the minor L-link 80a defines a first leg 98, a second leg 100 and a fixed pivot 92b. The first and second legs 98, 100, 94, 96 of the minor and major L-links 80a, 80b are rotatable about respective fixed pivots 92b, 92a. The minor L-links 80a are serially connected to each other through elongate bar 78c. In particular, the second legs 100 are rotatably attached to the elongate bar 78c along its length. Additionally, the second leg 96 of the major L-link 80b is rotatably attached to the elongate bar 78c, and the first leg 94 of the major L-link 80b is rotatably attached to the elongate bar 78b. In this regard, the downward force created by the lever 64 at the clamp pivot 74 on the elongate bar 78b equals the aggregate clamp downward force applied to the work piece 52 by the clamps 58.

Referring now to FIG. 4, the clamp linkage system 62 may comprise an elongate bar 78b which is rotatably attached to the C-link 82. The C-link defines a fixed pivot 92c, base 102, first leg 104 and second leg 106. The first leg 104, second leg 106 and base 102 rotate about the fixed pivot 92c in reaction to a downward force created by the lever 64 at the clamp pivot 74 and transmitted through the C-link 82, specifically, the first leg 104 of the C-link 82 by the elongate bar 78b. In response, the second leg 106 of the C-link 82 rotates counter clockwise in relation to the fixed pivot 92c of the C-link 82 until the clamp 58 contacts the work piece 52. In this way, the downward force created by the lever 64 at the clamp pivot 74 applied to the elongate bar 78b is transmitted to the work piece 52 by the clamp 58.

As stated above, the clamp pivot 74 is traversable between the up position and the down position. The traversable path of the clamp pivot 74 may be circular or linear. In relation to the circular traversable path of the clamp pivot 74, as shown in FIG. 4, an elongate bar 78d having a configuration of the letter "J" has a first distal end 108 at a fixed pivot 92d, and a second distal end 110 of the elongate bar 78d is rotatablably attached to the clamp pivot 74 on the lever 64. In this regard, the clamp pivot 74 of the lever 64 may traverse a circular path about the fixed pivot 92d of the first distal end 108 of the elongate bar 78d.

Alternatively, the clamp pivot 74 may traverse the up position and the down position in a linear path, as stated above. In this regard, the elongate bar 78b of the clamp linkage system 62 may be disposed within a fixed outer tube (not shown) which allows the elongate bar 78b to traverse freely in the vertical direction within the tube.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A boring machine for boring holes in a bottom side of a work piece, the boring machine comprising:
   a. a bed for receiving the work piece;
   b. a drill disposed below the bed and vertically traversable thereunder for working the bottom side of the work piece;
   c. a clamp disposed above the bed and vertically traversable thereabove for fixing a spatial relationship between the bed and the work piece;
   d. a drill linkage system attached to the drill;
   e. a clamp linkage system attached to the clamp; and
   f. a lever mechanically attached to the drill linkage system and mechanically operative to vertically traverse the drill, the lever mechanically attached to the clamp linkage system and mechanically operative to vertically traverse the clamp such that a clamp downward force is mechanically increased relative to an increasing drill upward force.

2. A boring machine for boring holes in a bottom side of a work piece, the boring machine comprising:

a. a bed for receiving the work piece;
b. a drill disposed below the bed and vertically traversable thereunder for working the bottom side of the work piece;
c. a clamp disposed above the bed and vertically traversable thereabove for fixing a spatial relationship between the bed and the work piece;
d. a drill linkage system attached to the drill;
e. a clamp linkage system attached to the clamp; and
f. a lever attached to the drill linkage system and the clamp linkage system such that a clamp downward force is mechanically and proportionally adjusted with respect to a drill upward force;
g. wherein the lever defines a drill pivot, clamp pivot and pedal portion, the lever is rotatable about the clamp pivot, the clamp pivot is vertically traversable and interposed between the drill pivot and the pedal portion, the lever is attached to the drill linkage system at the drill pivot, the lever is attached to the clamp linkage system at the clamp pivot.

3. The boring machine of claim 2 wherein the bed defines a work pattern, the work pattern being at least one throughhole wherein the work pattern is capable of passing at least a portion of the drill therethrough.

4. The boring machine of claim 2 wherein the drill pivot is biased to a down position.

5. The boring machine of claim 4 wherein the drill pivot is downwardly biased with a weight of the drill.

6. The boring machine of claim 4 wherein the clamp pivot is biased to an up position.

7. The boring machine of claim 6 wherein the drill pivot is downwardly biased with a spring.

8. The boring machine of claim 6 wherein an amount of downward bias on the drill pivot is greater than an amount of upward bias on the clamp pivot.

9. The boring machine of claim 2 wherein the clamp linkage system is at least one pull cable attached to the clamp and the lever.

10. The boring machine of claim 2 wherein the clamp linkage system comprises:
    a. at least one minor L-link attached to the clamp; and
    b. at least one major L-link attached to the minor L-link and lever.

11. The boring machine of claim 10 wherein the minor L-link(s) defines a fixed pivot, first leg and second leg, the first leg(s) of the minor L-link is attached to the clamp, the first and second legs are pivotable about the fixed pivot of the minor L-link, at least one first elongate bar is rotatably attached to the minor L-link(s) second leg(s), the major L-link(s) defines a fixed pivot, first leg and second leg wherein the second leg(s) of the major L-link(s) is rotatably attached to the first elongate bar, the first and second legs of the major L-link are pivotable about the fixed pivot of the major L-link, at least one second elongate bar is rotatably attached to the major L-link first leg(s) and the lever at the clamp pivot.

12. The boring machine of claim 2 wherein the clamp linkage system comprises at least one C-link attached to the clamp and the lever.

13. The boring machine of claim 12 wherein the C-link defines a base having a fixed pivot, first leg and second leg, the base, first leg and second leg are pivotable about the fixed pivot, the second leg is attached to the clamp, and an elongate bar is rotatably attached to the first leg of the C-link and the lever.

14. The boring machine of claim 2 further comprising a pressure applicator contactable to the pedal portion.

15. The boring machine of claim 14 wherein the pressure applicator is selected from the group consisting of solenoid, pneumatic cylinder, and hydraulic cylinder.

16. The boring machine of claim 1 wherein the clamp downward force is proportionately increased as the drill upward force is increased such that the clamp downward force is greater than the drill upward force.

17. A boring machine for boring holes in a bottom side of a work piece, the line boring machine comprising:
    a. a bed for receiving the work piece;
    b. a drill disposed below the bed and vertically traversable thereunder for working the bottom side of the work piece;
    c. a clamp disposed above the bed and vertically traversable thereabove for fixing a spatial relationship between the bed and the work piece;
    d. a drill linkage system attached to the drill;
    e. a clamp linkage system attached to the clamp; and
    f. a lever rotateably attached to the drill linkage system and the clamp linkage system for self adjusting a clamp downward force with respect to a drill upward force.

18. The machine of claim 17 wherein the clamp downward force is increased as the drill upward force is increased.

19. The boring machine of claim 17 wherein the clamp downward force is proportionately increased as the drill upward force is increased.

20. The boring machine of claim 17 wherein the clamp downward force is always greater than a drill upward force.

21. A method for boring holes in a bottom side of a work piece, the method comprising the steps of:
    a. providing a boring machine comprising:
        i. a bed for receiving the work piece;
        ii. a drill disposed below the bed and vertically traversable thereunder for working the bottom side of the work piece;
        iii. a clamp disposed above the bed and vertically traversable thereabove for fixing a spatial relationship between the bed and the work piece;
        iv. a drill linkage system attached to the drill;
        v. a clamp linkage system attached to the clamp; and
        vi. a lever attached to the drill linkage system and the clamp linkage system for self adjusting a clamp downward force with respect to a drill upward force;
    b. actuating the clamp via the lever for applying the clamp downward force on the work piece;
    c. after actuating the clamp, actuating the drill via the lever for vertically raising the drill toward the work piece; and
    d. upon contact of the drill to the work piece, transferring a force exerted on the drill by the work piece to the clamp through the lever such that the clamp downward force is increased as the drill upward force is increased.

22. The method of claim 21 wherein the clamp downward force is proportionately increased as the drill upward force is increased.

* * * * *